(12) United States Patent
Kwa et al.

(10) Patent No.: US 11,077,708 B2
(45) Date of Patent: Aug. 3, 2021

(54) MOBILE ROBOT HAVING AN IMPROVED SUSPENSION SYSTEM

(71) Applicant: Locus Robotics Corp., Wilmington, MA (US)

(72) Inventors: Hian Kai Kwa, Reading, MA (US); Peter Sussman, Winchester, MA (US); Michael Sussman, Winchester, MA (US)

(73) Assignee: Locus Robotics Corp., Wilmington, MA (US)

( * ) Notice: Subject to any disclaimer, the term of this patent is extended or adjusted under 35 U.S.C. 154(b) by 148 days.

(21) Appl. No.: 16/221,865

(22) Filed: Dec. 17, 2018

(65) Prior Publication Data
US 2019/0184742 A1    Jun. 20, 2019

Related U.S. Application Data (60) Provisional application No. 62/607,256, filed on Dec. 18, 2017.

(51) Int. Cl.
*B60B 33/04*       (2006.01)
*B60G 11/18*       (2006.01)
(Continued)

(52) U.S. Cl.
CPC ............. *B60B 33/045* (2013.01); *B25J 5/007* (2013.01); *B25J 19/0091* (2013.01);
(Continued)

(58) Field of Classification Search
CPC ...... B62D 61/00; B62D 61/04; B60B 33/045; B62J 5/007; B60G 11/18
(Continued)

(56) References Cited

U.S. PATENT DOCUMENTS 800,377 A  *  1/1905  Kurtz ................... B60B 33/045
                                                    16/44
2,067,546 A  *  1/1937  Rocher ................. B62D 61/04
                                                    180/21
(Continued)

FOREIGN PATENT DOCUMENTS

CN       107323194        *  1/2017   ............. B62D 61/00
CN       107323194 A     11/2017
(Continued)

OTHER PUBLICATIONS

International Search Report and Written Opinion, dated May 21, 2019, received in international patent application No. PCT/US18/65934, 13 pages.

*Primary Examiner* — Tony H Winner
(74) *Attorney, Agent, or Firm* — Sunstein LLP (57) ABSTRACT

A mobile robot configured to drive on a surface with irregularities, comprising: a chassis having a front end facing a forward direction of travel, a back end, a first side, and a second side. There is a first drive wheel rigidly affixed to the chassis proximate the first side and interconnected to a motor to propel it. There is a second drive wheel rigidly affixed to the chassis proximate the second side and interconnected to a motor to propel it. A first caster assembly is rigidly affixed to the chassis proximate the front end and includes a first caster wheel configured to rotate about a first swivel axis. A second caster assembly is rigidly affixed to the chassis proximate the back end and includes a second caster wheel configured to rotate about a second swivel axis and it includes a compliant member to absorb the irregularities.

9 Claims, 7 Drawing Sheets

(51) Int. Cl.
  *B62D 21/11* (2006.01)
  *B62D 21/18* (2006.01)
  *B25J 5/00* (2006.01)
  *B25J 19/00* (2006.01)
  *B25J 19/02* (2006.01)
  *B60G 3/02* (2006.01)
  *B62D 61/04* (2006.01)

(52) U.S. Cl.
  CPC ............. *B25J 19/022* (2013.01); *B60G 3/02* (2013.01); *B60G 11/18* (2013.01); *B62D 21/11* (2013.01); *B62D 21/18* (2013.01); *B62D 61/04* (2013.01); *B60B 2900/131* (2013.01)

(58) Field of Classification Search
  USPC ........................................................... 16/44
  See application file for complete search history.

(56) References Cited

U.S. PATENT DOCUMENTS

| | | | | |
|---|---|---|---|---|
| 2,453,916 | A | * | 11/1948 | Inskeep ................ B60B 33/045 16/44 |
| 2,923,961 | A | * | 2/1960 | Black .................... B60B 33/045 16/44 |
| 3,709,313 | A | * | 1/1973 | James .................... A63H 11/10 180/21 |
| 9,463,927 | B1 | | 10/2016 | Theobald |
| 10,336,380 | B2 | * | 7/2019 | Sakashita ............... B62D 63/02 |
| 10,780,929 | B2 | * | 9/2020 | Moulin .................. B62D 21/18 |
| 2010/0219005 | A1 | * | 9/2010 | Sandberg ............... B62D 39/00 180/21 |
| 2010/0296908 | A1 | | 11/2010 | Ko |
| 2011/0200420 | A1 | | 8/2011 | Driskill et al. |
| 2012/0330458 | A1 | | 12/2012 | Weiss |
| 2013/0317642 | A1 | | 11/2013 | Asaria et al. |
| 2019/0291528 | A1 | * | 9/2019 | Pajevic ............. B60G 17/0195 |
| 2019/0380552 | A1 | * | 12/2019 | Han ...................... B25J 19/005 |
| 2020/0017145 | A1 | * | 1/2020 | Xiong .................... B62D 63/02 |

FOREIGN PATENT DOCUMENTS

| | | |
|---|---|---|
| CN | 107472397 A | 12/2017 |
| JP | 2012228996 A | 11/2012 |
| JP | 2015051720 A | 3/2015 |
| WO | WO 2007/149255 A2 | 12/2007 |

\* cited by examiner

MOBILE ROBOT HAVING AN IMPROVED SUSPENSION SYSTEM

CROSS-REFERENCE TO RELATED APPLICATIONS

This application claims the benefit of priority to U.S. Application Ser. No. 62/607,256, filed Dec. 18, 2017, which is incorporated herein by reference.

FIELD OF THE INVENTION

The subject matter disclosed herein relates generally to an improved mobile robot suspension system, and more specifically to such a suspension system using a combination of rigid drive wheels, a rigid passive caster wheel and a passive caster wheel having a compliant member to absorb the irregularities in the surface on which the mobile robot travels.

BACKGROUND OF THE INVENTION

In many application robots are used to perform functions in place of humans or to assist humans in order to increase productivity and efficiency. Such applications may require that the robots precisely navigate within a space using sensors, such as laser radar, which must constantly scan the space. The scans must be taken in a level plane, in order to obtain data that will allow precise navigation. Thus movement of the robot up and down as well as side to side which will impact the consistency of the scan plane must be limited. Limiting the amount of deflection by the wheels of the robot will limit movement of the scan plane and is therefore good for navigation. This can be accomplished by providing a rigid connection between the chassis and the wheels (i.e. a rigid interconnection). While the surfaces over which the robots travel are substantially flat/even, there are always irregularities which may cause unevenness in the surface. With no suspension, the irregularities are not absorbed which makes it difficult for the robot to maintain traction, which can negatively impact the navigation process.

Therefore there is a need for a suspension for a mobile robot that can absorb surface irregularities to allow the robot to maintain traction, while limiting the movement of the sensors, such as laser radar, which hinders proper navigation.

SUMMARY OF INVENTION

In one aspect the invention includes a mobile robot configured to drive on a surface with irregularities. There is a chassis having a front end facing a forward direction of travel of the mobile robot, a back end, a first side, and a second side. There is a first drive wheel rigidly affixed to the chassis proximate the first side and interconnected to at least one motor to propel the first drive wheel. There is also a second drive wheel rigidly affixed to the chassis proximate the second side and interconnected to the at least one motor to propel the second drive wheel. A first caster assembly is rigidly affixed to the chassis proximate the front end of the chassis. The first caster assembly includes a first swivel mechanism to which a first caster wheel is rotatably affixed via a rigid interconnection member to rotate about a first swivel axis. There is a second caster assembly rigidly affixed to the chassis proximate the back end of the chassis. The second caster assembly includes a second swivel mechanism to which a second caster wheel is rotatably affixed via a compliant interconnection member to rotate about a second swivel axis. When the at least one motor propels the first and second drive wheels, thereby causing the mobile robot to drive on the surface, the compliant interconnection member of the second caster assembly absorbing the irregularities in the surface.

In another aspect, one or more of the following features may be included. There may further be included a platform supported by the chassis and configured to carry a load. There may be a first motor connected to the first drive wheel via a first axle and a second motor connected to the second drive wheel via a second axle, thereby allowing the first and second drive wheels to be propelled independently. The chassis may include a bottom surface having a first cavity in which the first caster assembly is disposed and a second cavity in which the second caster assembly is disposed. The first swivel mechanism may be rigidly affixed to a base of the first cavity and the rigid interconnection member may include a bracket which is rotatably connected at a first end to the first swivel mechanism and at a second end of the bracket the first caster wheel is connected. The second swivel mechanism may be rigidly affixed to a base of the second cavity and the compliant interconnection member may include a spring which is rotatably connected at a first end to the second swivel mechanism and at a second end of the spring the second caster wheel is connected. The spring may be a torque spring. There may be further included at least one sensor located proximate the front end of the chassis configured to provide sensor data to a robot controller for navigation of the mobile robot. The first and second drive wheels may be positioned between the first caster assembly proximate the front end of the chassis and the second caster assembly proximate the back end of the chassis.

BRIEF DESCRIPTION OF THE FIGURES

Embodiments of the present disclosure will now be described, by way of example only, with reference to the attached Figures, wherein.

DETAILED DESCRIPTION OF THE INVENTION

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Figure 1A:
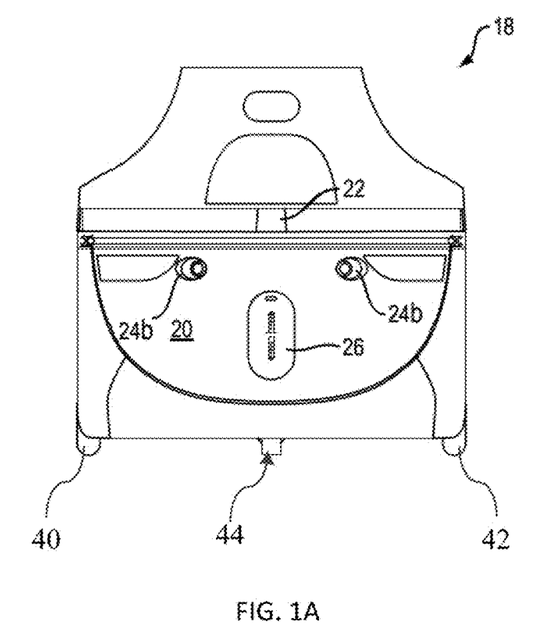
FIG. 1A is a front elevational view of a base of a mobile robot according to an aspect of the invention.
Figure 1B:
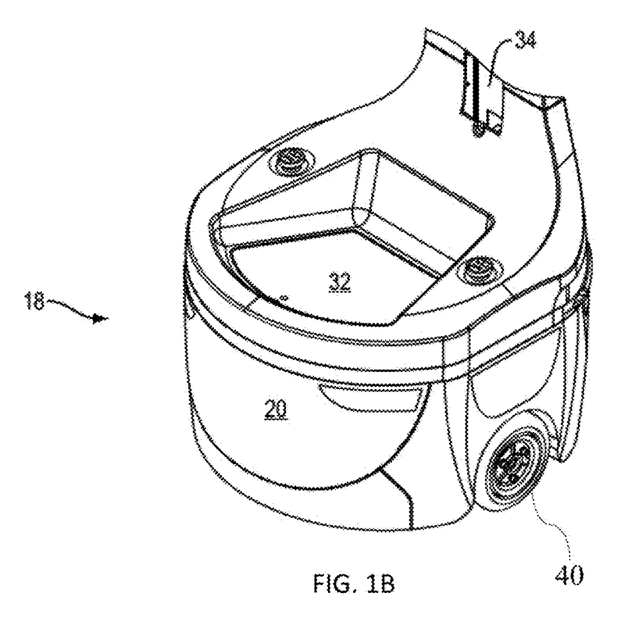
FIG. 1B is a perspective view of the back of the base of the mobile robot of FIG. 1A.

In a preferred embodiment, a robot 18, shown in FIGS. 1A and 1B, includes an autonomous wheeled base 20 having a laser-radar sensor 22. The base 20 may also feature a transceiver (not shown) that enables the robot 18 to receive instructions remotely from a server or other computer device. Other sensors, such as a pair of digital optical cameras 24a and 24b, may be included. The robot base may also include an electrical charging port 26 for re-charging the batteries which power autonomous wheeled base 20. The base 20 further features a processor (not shown) that receives data from the laser-radar sensor 22 and cameras 24a and 24b to capture information representative of the robot's environment. There is a memory (not shown) that operates with the processor to carry out various tasks associated with navigation within a space. Wheeled base 20 is built upon a metal chassis, only the bottom 210 of which is visible in FIG. 4, and is enclosed within a hard plastic housing on the exterior, as shown in the other figures.

Wheeled base is propelled by first and second drive wheels 40 and 42, respectively, which may be rigidly affixed to the chassis via axles. Each axle be connected to an electric motor to independently drive each wheel. By being able to vary the speed and rotational direction of each wheel, this allows the robot to be propelled in all directions with the two drive wheels alone. There are further included first caster wheel assembly 44 and second caster wheel assembly 46 (not shown in this figure) which provide support but are only passive wheels. The components of the wheeled base 20, such as the laser-radar sensor 22, digital optical cameras 24a and 24b, the drive wheels 40 and 42 and the caster assemblies 44 and 46 may be mounted to the chassis. The casters are passive wheels that provide additional support to the robots. All together, the wheels and casters combine to support the mass of the robot.

Referring to FIG. 1B, base 20 includes platform 32 where a load (such as one or more items) may be directly carried or a tote or bin may be placed on the platform 32 to carry one or more items. There is also shown a coupling 34 that may engage an armature (not shown), which may support a one or more additional platforms for supporting items or totes. In addition, a tablet or other computer input/output device (not shown) may be mounted on the armature or elsewhere to allow a human to interact with robot 18. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Figure 2:
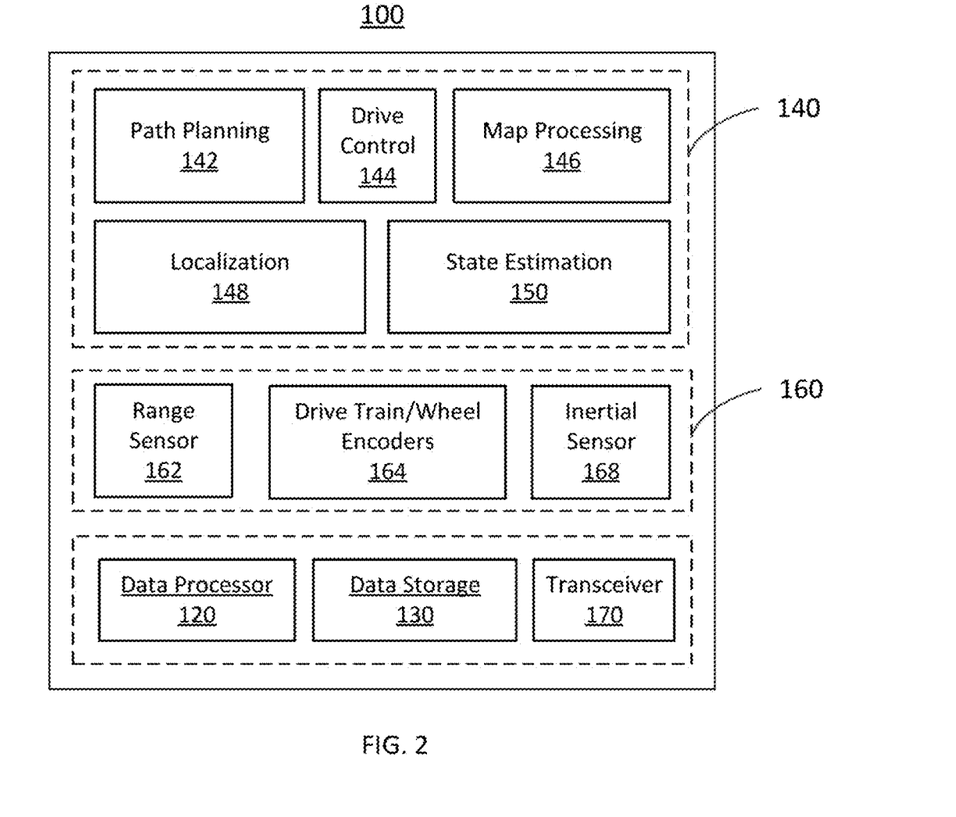
FIG. 2 shows one embodiment of a robot system for use with the methods and systems of present invention.

FIG. 2 illustrates a system view of one exemplary embodiment of robot 18. Robot system 100 may comprise data processor 120, data storage 130, processing modules 140, and sensor support modules 160. Processing modules 140 may include path planning module 142, drive control module 144, map processing module 146, localization module 148, and state estimation module 150. Sensor support modules 160 may include range sensor module 162, drive train/wheel encoder module 164, and inertial sensor module 168.

Data processor 120, processing modules 142 and sensor support modules 160 are capable of communicating with any of the components, devices or modules herein shown or described for robot system 100. A transceiver module 170 may be included to transmit and receive data. Transceiver module 170 may transmit and receive data and information to and from a supervisor system or to and from one or other robots. Transmitting and receiving data may include map data, path data, search data, sensor data, location and orientation data, velocity data, and processing module instructions or code, robot parameter and environment settings, and other data necessary to the operation of robot system 100.

In some embodiments, range sensor module 162 may comprise one or more of a scanning laser, radar, laser range finder, range finder, ultrasonic obstacle detector, a stereo vision system, a monocular vision system, a camera, and an imaging unit. Range sensor module 162 may scan an environment around the robot to determine a location of one or more obstacles with respect to the robot. In a preferred embodiment, drive train/wheel encoders 164 comprises one or more sensors for encoding wheel position and an actuator for controlling the position of one or more wheels (e.g., ground engaging wheels). Robot system 100 may also include a ground speed sensor comprising a speedometer or radar-based sensor or a rotational velocity sensor. The rotational velocity sensor may comprise the combination of an accelerometer and an integrator. The rotational velocity sensor may provide an observed rotational velocity for the data processor 120, or any module thereof.

In some embodiments, sensor support modules 160 may provide translational data, position data, rotation data, level data, inertial data, and heading data, including historical data of instantaneous measures of velocity, translation, position, rotation, level, heading, and inertial data over time. The translational or rotational velocity may be detected with reference to one or more fixed reference points or stationary objects in the robot environment. Translational velocity may be expressed as an absolute speed in a direction or as a first derivative of robot position versus time. Rotational velocity may be expressed as a speed in angular units or as the first derivative of the angular position versus time. Translational and rotational velocity may be expressed with respect to an origin 0,0 (e.g. FIG. 1, 110) and bearing of 0-degrees relative to an absolute or relative coordinate system. Processing modules 640 may use the observed translational velocity (or position versus time measurements) combined with detected rotational velocity to estimate observed rotational velocity of the robot.

The propulsion system may comprise an electric motor, a drive motor, an alternating current motor, an induction motor, a permanent magnet motor, a direct current motor, or another suitable motor for propelling a robot. The propulsion system may comprise a motor controller (e.g., an inverter, chopper, wave generator, a multiphase controller, variable frequency oscillator, variable current supply, or variable voltage supply) for controlling at least one of the velocity, torque, and direction of rotation of the motor shaft of the electric motor. Preferably, drive control 144 and propulsion system (not shown) is a differential drive (DD) control and propulsion system. In a DD control system robot control is non-holonomic (NH), characterized by constraints on the achievable incremental path given a desired translational and angular velocity. Drive control 144 in communication with propulsion system may actuate incremental movement of the robot by converting one or more instantaneous velocities determined by path planning module 142 or data processor 120.

One skilled in the art would recognize other systems and techniques for robot processing, data storage, sensing, control and propulsion may be employed without loss of applicability of the present invention described herein.

A robot outfitted with sensors, as described above, can use its sensors for localization as well as contribute to the building and maintenance of the map of its environment which are needed for the robot to navigate the environment. Sensors used for map building and localization may include light detection and ranging ("LIDAR" or "laser scanning" or "laser-radar") sensors, such as laser-radar sensor 22, FIG. 1A. In order for laser radar sensor 22 to work properly and provide data sufficient for robot 18 to effectively navigate its environment, robot 18 needs to stay as level as possible level so that laser radar sensor 22 can scan a consistent plane in front of the robot. If the plane tips up or down, the environment will appear different to robot 18, especially at distance, and it will negatively impact the robot's ability to navigate.

Figure 3:
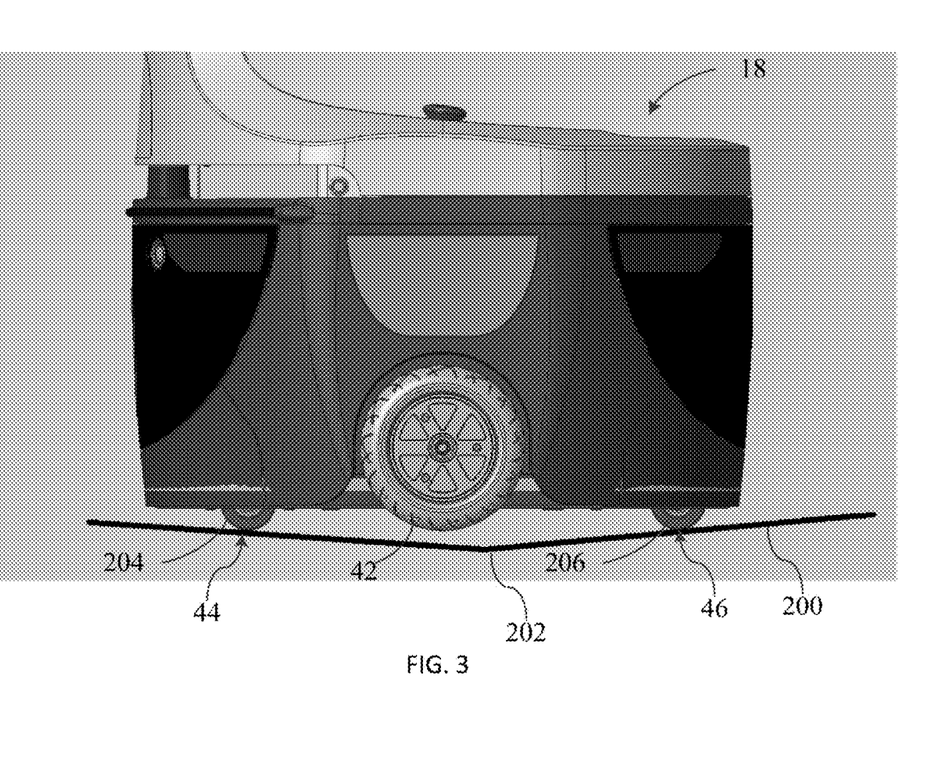
FIG. 3 shows a side elevational view the robot of FIG. 1 traveling on an irregular surface.

In order to most effectively maintain a level plane for the laser radar sensor, all of the wheels, namely, drive wheels 40 and 42 and the caster assemblies 44 and 46, would be rigidly affixed to the chassis and would not include any compliance members between the wheels and the interconnection to the chassis. Assuming that robot 18 would be navigating on a perfectly flat/level surface with no irregularities this would be the most effective approach. However, in real applications, the surfaces on which the robot will navigate will have irregularities. An example of such as irregularity is depicted in FIG. 3 where floor 200 includes a dip 202. In this example, caster assemblies 44 and 46 are rigidly affixed to the chassis of robot 18 and do not include any compliance members between the caster wheels 204 and 206 and the chassis. As a result, drive wheels 40 (not visible) and 42 are suspended off the floor 200 as robot 18 travels over dip 202. This causes robot 18 to lose traction/propulsion via drive wheels 40 and 42 and causes the mobile base to move somewhat erratically which can affect the robot's ability to accurately localize itself and ultimately impact accurate navigation.

Figure 4:
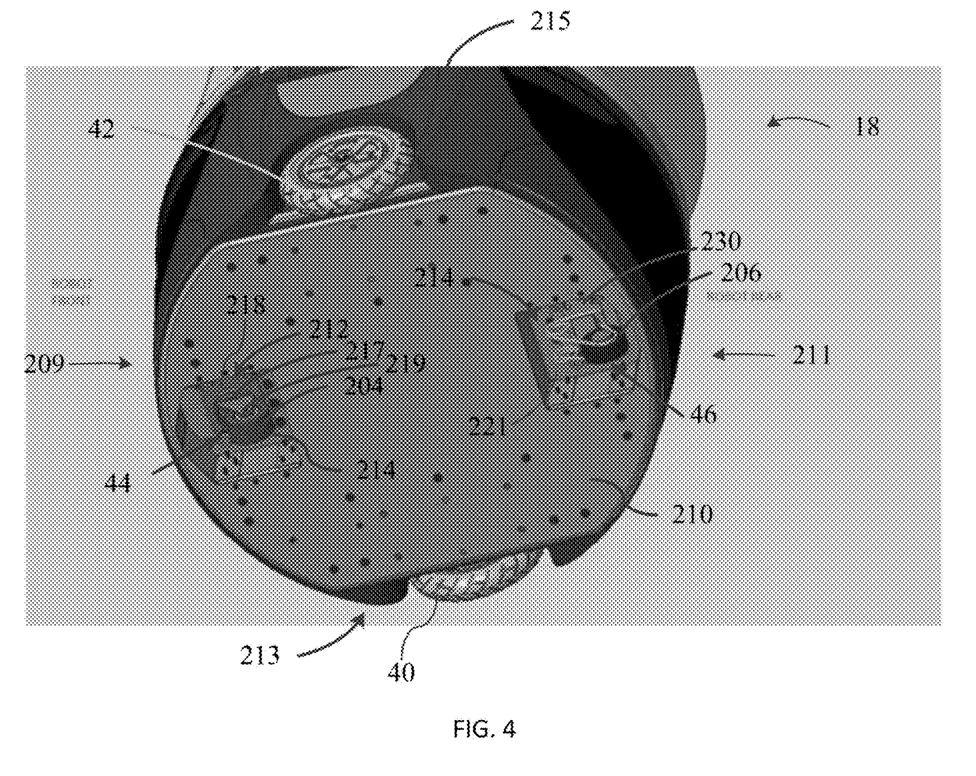
FIG. 4 shows a perspective view of the underside of the mobile robot base of FIG. 1A.

A unique suspension system is depicted in FIG. 4 for robot 18 which provides sufficient compliance to maintain traction on irregular surfaces while at the same time maintains robot 18 as level as possible so that laser radar sensor 22 can scan a consistent plane in front of the robot. This suspension system provides an overall improvement in the robots ability to accurately navigate surfaces with irregularities.

Bottom surface 210 of the chassis of robot 18 is shown in FIG. 4 connected to a front end 209, a back end 211, a first side 213, and a second side 215. First drive wheel 40 is rigidly affixed to the chassis at the first side 213 and interconnected to a motor (not shown) to propel the first drive wheel 40. Second drive wheel 42 is rigidly affixed to the chassis at second side 215 and interconnected to a motor to propel the second drive wheel 42. Two different motors may be used to independently propel the drive wheels to allow for full motion of robot 18 in any direction.

Figure 5:
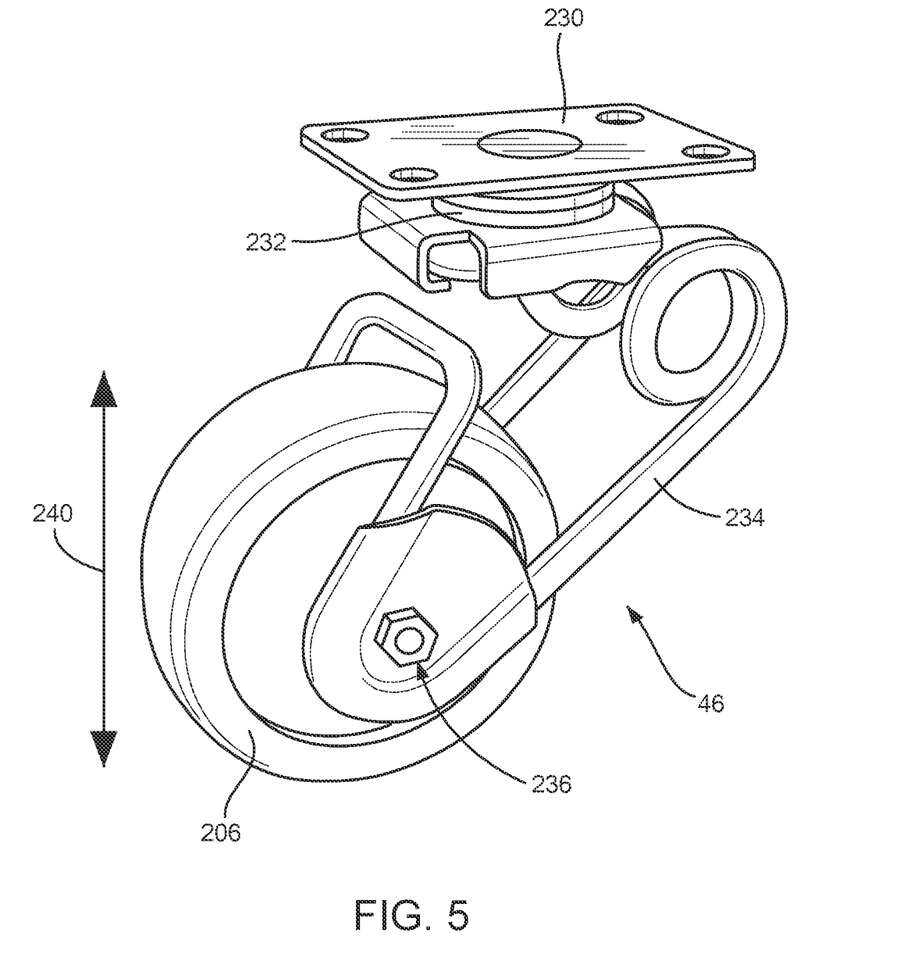
FIG. 5 shows a perspective view of the second caster assembly of FIG. 4.

There is also included a first caster assembly 44 disposed within first caster recess 212 and rigidly affixed to base 216 of first caster recess 212 proximate front end 209 of the chassis via a baseplate 218. The first caster assembly 44 includes a first swivel mechanism 217 rotatably connected to baseplate 218 and to a first caster wheel 204 affixed via a rigid interconnection member 219 (e.g. a bracket) to rotate about a first swivel axis. There is a second caster assembly 46 disposed within second caster recess 214 and rigidly affixed to base 221 of second caster recess 214 proximate back end 211 of the chassis via a baseplate 230. The second caster assembly 46 includes a second swivel mechanism 232, FIG. 5, to which second caster wheel 206 is rotatably affixed via a compliant interconnection member 234 to rotate about a second swivel axis. The second swivel mechanism 232 is rotatably affixed to base plate 230, which in turn provides for a rigid connection of the second caster assembly 46 to the chassis via baseplate 230.

As described above, drive wheels 40 and 42 are rigidly connected to the chassis via axles (not shown). Moreover, drive wheels may be made of a hard plastic or rubber material with substantially no compliance, even when the robot 18 is carrying its load. In addition, first caster assembly 44 provides support for robot 18 with substantially no compliance due to the rigid connection to the chassis and the rigid interconnection member 219 (e.g. a bracket) which connects the swivel mechanism 217 to caster wheel 204. The combined effect of the drive wheels 40 and 42 and the first caster assembly 44 proximate front end 209 of robot 18, is to maintain robot 18 as level as possible at the front end 209 where the laser radar sensor 22 is located to provide a consistent scan plane in front of the robot.

In order to absorb irregularities in the surface on which the robot travels, while not impacting the scan plane of the laser radar sensor 22, the second caster assembly 46 is disposed proximate back end 211 of the chassis. Referring again to FIG. 5, compliant interconnection member 234, which in this example is a torque spring, allows for movement in the vertical direction (up and down) as indicated by arrow 240. This allows the robot 18 to absorb irregularities in the travel surface and still allow drive wheels 40 and 42 to maintain contact with the travel surface.

Figure 6:
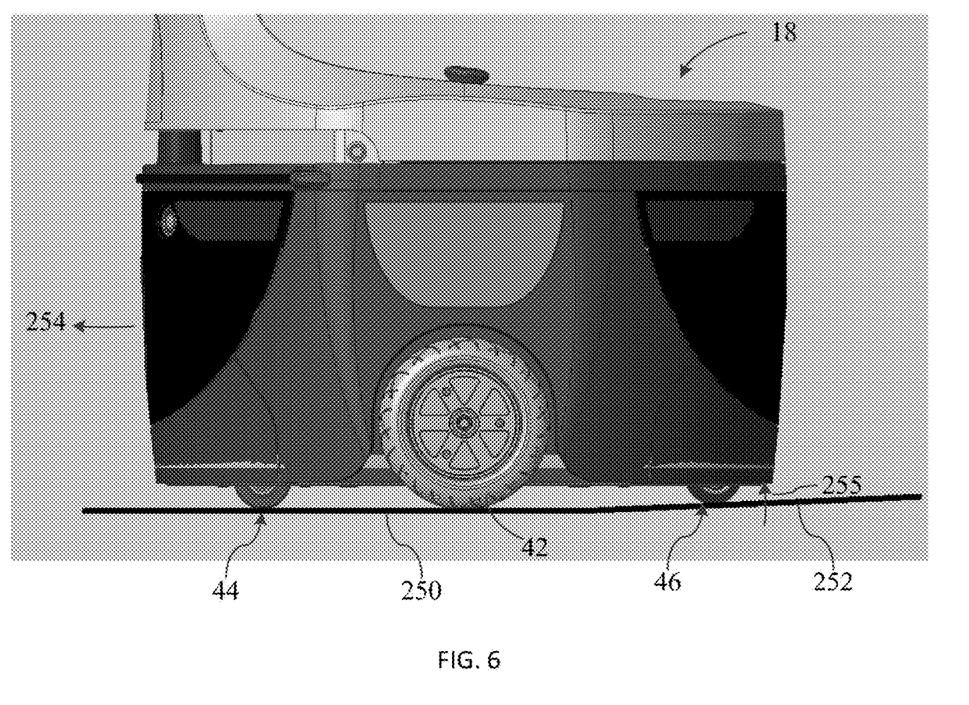
FIG. 6 shows a side elevational view the robot of FIG. 4 traveling on one type of an irregular surface.
Figure 7:
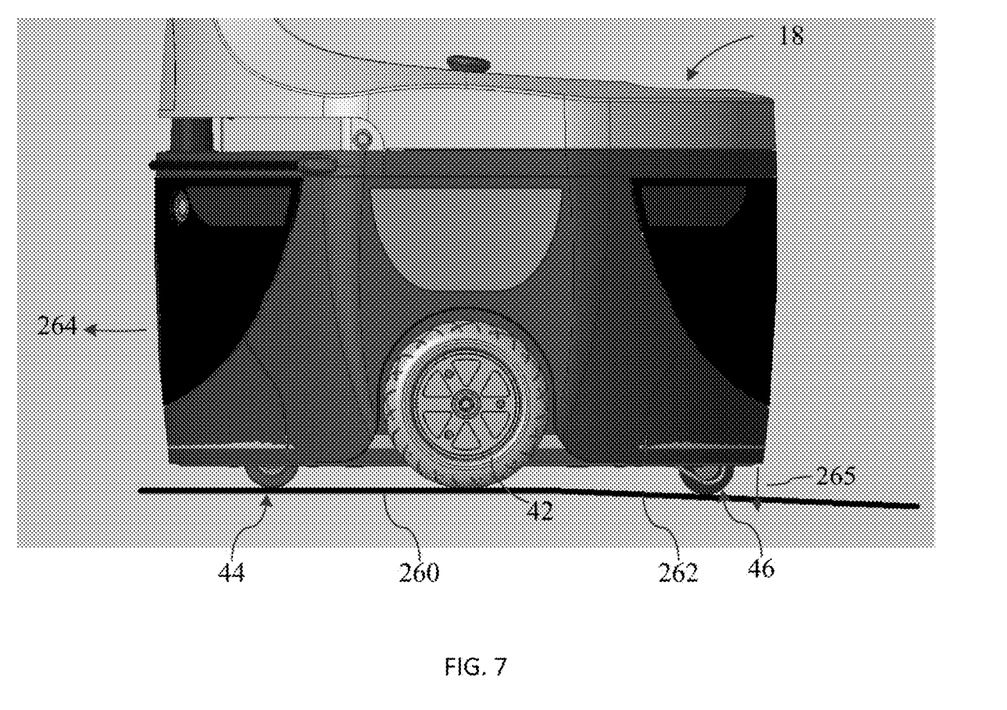
FIG. 7 shows a side elevational view the robot of FIG. 4 traveling on another type of an irregular surface.

As shown in FIG. 6, as robot 18 travels down incline 252 of surface 250 in the direction of arrow 254, the second caster assembly is compressed, i.e. travels up in the direction of arrow 255 to allow drive wheel 42 to stay in contact with the surface 250. This is in contrast to FIG. 3 which shows with rigid caster assemblies the drive wheels may become separated from the surface. As shown in FIG. 7, as robot 18 travels up incline 262 of surface 260 in the direction of arrow 264, the second caster assembly, which was is under compression, is released and travels in the direction of arrow 265 to allow drive wheel 42 to stay in contact with the surface 250. In each case, all four wheels maintain contact with the surface and allow for more even weight distribution.

Referring again to FIG. 5, as described above, second caster assembly 46 includes a second swivel mechanism 232, rotatably affixed to base plate 230, which in turn provides for a rigid connection of the second caster assembly 46 to the chassis via baseplate 230. Compliant interconnection member 234 (e.g. torque spring) interconnects to second caster wheel 206 via axle 236, which allows caster wheel 206 to passively rotate as robot 18 is propelled by drive wheels 40 and 42. Since swivel caster 232 is located above (in the direction of arrow 240 relative to the surface on which caster wheel 206 would ride), the compliant interconnection member 234 can travel up and down in the direction of arrow 24 without impacting the rotation of swivel caster 232 under loading, since swivel caster is rigidly affixed to the chassis via baseplate 230. While it would be possible to affix a compliant interconnection member (e.g. above the swivel caster) in order to ensure the swivel caster rotation is not impacted under loading significant reinforcement of the compliant member would be required and this would take up valuable space within the chassis of the robot. Thus, the placement of the compliant member 234 below the rigidly affixed swivel caster 232 provides an elegant solution to maintain proper swivel caster rotation under loading while not requiring complex and space consuming mechanical reinforcements. In other words, compliance in the direction of arrow 240 is achieved while not changing the swivel angle without requiring significant mechanical reinforcements.

It should be noted that any suitable type of compliant member (such as a compression spring or other type of device or material that is compressible) be used, with or without, damping mechanisms in place of a torque spring disclosed herein. A suitable torque spring for this application may be sourced from Sisiku Addkreis Corp under part no. SALTS4-50-VPA K.

While the foregoing description enables one of ordinary skill to make and use what is considered presently to be the best mode of the all-angle ground clamp, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above described embodiments and examples, embodiments, and applications within the scope and spirit of the invention claimed as follows.

We claim:

1. A mobile robot configured to drive on a surface with irregularities, comprising:
    a chassis having a front end facing a forward direction of travel of the mobile robot, a back end, a first side, and a second side;
    a first drive wheel rigidly affixed to the chassis proximate the first side and interconnected to at least one motor to propel the first drive wheel;
    a second drive wheel rigidly affixed to the chassis proximate the second side and interconnected to the at least one motor to propel the second drive wheel;
    a first caster assembly rigidly affixed to the chassis proximate the front end of the chassis; wherein the first caster assembly includes a first swivel mechanism to which a first caster wheel is rotatably affixed via a rigid interconnection member to rotate about a first swivel axis; and
    a second caster assembly rigidly affixed to the chassis proximate the back end of the chassis; wherein the second caster assembly includes a second swivel mechanism to which a second caster wheel is rotatably affixed via a compliant interconnection member to rotate about a second swivel axis;
    a laser-radar sensor located proximate the front end of the chassis configured to provide sensor data to a robot controller for navigation of the mobile robot;
    wherein when the at least one motor propels the first and second drive wheels, thereby causing the mobile robot to drive on the surface, the compliant interconnection member of the second caster assembly absorbing the irregularities in the surface and the rigid interconnection member of the first caster assembly maintaining the front end of the chassis level with the surface to provide a consistent scan plane for the laser-radar sensor.

2. The mobile robot of claim 1 further including a platform supported by the chassis and configured to carry a load.

3. The mobile robot of claim 2 wherein the at least one motor includes a first motor connected to the first drive wheel via a first axle and a second motor connected to the second drive wheel via a second axle, thereby allowing the first and second drive wheels to be propelled independently.

4. The mobile robot of claim 3 wherein the chassis includes a bottom surface having a first cavity in which the first caster assembly is disposed and a second cavity in which the second caster assembly is disposed.

5. The mobile robot of claim 4 wherein the first swivel mechanism is rigidly affixed to a base of the first cavity and the rigid interconnection member includes a bracket which is rotatably connected at a first end to the first swivel mechanism and at a second end of the bracket the first caster wheel is connected.

6. The mobile robot of claim 5 wherein the second swivel mechanism is rigidly affixed to a base of the second cavity and the compliant interconnection member includes a spring which is rotatably connected at a first end to the second swivel mechanism and at a second end of the spring the second caster wheel is connected.

7. The mobile robot of claim 6 wherein the spring is a torque spring.

8. The mobile robot of claim 1 wherein the first and second drive wheels are positioned between the first caster assembly proximate the front end of the chassis and the second caster assembly proximate the back end of the chassis.

9. The mobile robot of claim 1 wherein the second swivel mechanism is affixed to the chassis and wherein the second swivel mechanism is positioned above the compliant interconnection member relative the surface.

* * * * *